United States Patent [19]

Scherzinger

[11] 4,256,521
[45] Mar. 17, 1981

[54] POROUS METAL AGGLOMERATES

[75] Inventor: Rudolf Scherzinger, Johannesburg, South Africa

[73] Assignee: Metal Sales Company (Proprietary) Limited, Benoni, South Africa

[21] Appl. No.: 39,747

[22] Filed: May 16, 1979

Related U.S. Application Data

[63] Continuation-in-part of Ser. No. 891,314, Mar. 29, 1978, abandoned, which is a continuation of Ser. No. 679,461, Apr. 22, 1976, Pat. No. 4,089,715, which is a continuation of Ser. No. 494,311, Aug. 2, 1974, abandoned.

[30] Foreign Application Priority Data

Sep. 5, 1973 [ZA] South Africa .................... 73/6092
May 29, 1978 [ZA] South Africa .................... 78/3048

[51] Int. Cl.$^3$ ................................. C06B 45/32
[52] U.S. Cl. ........................... 149/6; 149/114
[58] Field of Search ............................ 149/6, 7, 114

[56] References Cited

U.S. PATENT DOCUMENTS

| | | | |
|---|---|---|---|
| 3,788,906 | 1/1974 | Schroeder | 149/6 |
| 3,830,671 | 8/1974 | McArdle | 149/114 X |
| 4,089,715 | 5/1978 | Scherzinger | 149/114 X |

*Primary Examiner*—Leland A. Sebastian
*Attorney, Agent, or Firm*—Cushman, Darby & Cushman

[57] ABSTRACT

The invention is concerned with porous metal agglomerates suitable for use in metal fuels and consisting of combustible powders of nodular, flaky, irregular or acicular shape and preferably a mixture of aluminium and silicon although aluminium, aluminium alloy or aluminium mixed with silicon, magnesium or iron or alloys of these metals can be used. The powder is of 0 to 500 microns size range or a cut thereof and is granulated with a synthetic resin binder by build-up to a porous agglomerate having a size range of 100 to 2500 microns and an apparent density of between 0,4 and 1,1.

9 Claims, No Drawings

POROUS METAL AGGLOMERATES

CROSS-REFERENCE TO RELATED APPLICATIONS

This application is a continuation-in-part of my earlier application Ser. No. 891,314 filed Mar. 29, 1978, now abandoned, which in turn is a continuation of my earlier application Ser. No. 679,461 filed Apr. 22, 1976, now U.S. Pat. No. 4,089,715, which in turn is a continuation of my earlier application Ser. No. 494,311 filed Aug. 2, 1974, now abandoned.

This invention relates to porous metal agglomerates and more particularly to such agglomerates useful as a fuel in blasting agents or explosives.

As far as possible powder metallurgy terminology used in this specification is in accordance with International Organization for Standardization Draft 1SO/DIS 3252.

Combustible metal powders have long been used as fuels or sensitisers in blasting agents and explosives and in particular aluminium is very widely used. In order to obtain optimum and instantaneous use of the energy of these fuels it is desirable that the particles thereof have a sufficiently large surface to mass ratio to combust at high rate. One convenient method of preparing aluminium powder as a fuel is by the atomising process. This, however, has the disadvantage of resulting in a high proportion of fines of a size less than 80 microns. This fine material is inclined to be suspended in air and may result in a spontaneous explosion. It is also dense and difficult to handle mechanically.

It has been proposed in South African Pat. No. 73/6092 to use a carrier for this fine material and that product has proved practically and commercially successful.

It is the object of the present invention to provide a fuel for blasting agents or explosives which is made from fine particles produced during the manufacture of metal powders.

According to this invention there is provided porous metal fuel agglomerates comprising a combustible metal powder of a size range of 0 to 500 microns, or any cut thereof, granulated with a binder of synthetic resin material by build-up to a porous agglomerate with a size range of 100 to 2500 microns having an apparent density between 0,4 to 1,1.

Further features of this invention provide for the combustible powder to be of nodular, flaky, irregular or acicular shape and to consist of aluminium, aluminium alloy, or aluminium mixed with silicon, magnesium, iron or alloys thereof. Particularly the powder will comprise a mixture of aluminium and silicon or other combustible metals in such proportions as to yield optimum and economical use of energy.

The invention also provides for the binder to be an emulsion or solution of vinyl polymers or other resins including thermosetting resins. Particularly the binders will be obtained from polyvinyl alcohol and polyvinyl acetate.

An important feature of this invention is a sensitised fuel, comprising agglomerates as above defined, having a size range of 100 to 850 microns partly filled and coated with a sensitising material such as aluminium flake.

In one preferred example of this invention granules were prepared using

| | | |
|---|---|---|
| 80% | 200µ 85% Al powder | 400g |
| 16% | Coarse Si | 60g |
| 4% | Fines Si | 40g |
| | | 500g |

To this was added 16% m/m of SYNTA 1203 (80 g), a polyvinyl alchol based adhesive obtained from "Henkel" in South Africa.

The mixture was subjected to build-up granulation in a Starmix blender for 5 minutes. Thereafter the resulting granules were air-dried at ambient temperature for a period of approximately 24 hours.

The starting material used had the following size analysis:

| | 85% Al −200µm | Coarse Si | Fine Si |
|---|---|---|---|
| Density (in microns) | 1,176 % | 1,03 % | 0,767 % |
| +425µ | 0 | 0 | 0 |
| −425µ + 315 | 0 | 0,5 | 0,1 |
| −315 + 250 | 10,6 | 30,8 | 0,5 |
| −250 + 150 | 59,1 | 41,7 | 3,8 |
| −150 + 106 | 16,8 | 12,2 | 51,8 |
| −106 + 63 | 8,7 | 9,2 | 28,2 |
| −63 + 45 | 2,7 | 3,5 | 7,2 |
| −45 | 2,1 | 2,1 | 8,4 |
| Particle Shape | Irregular to Nodular | Angular | Angular |

The dried product was very free flowing and had the following size analysis:

| Density = | 0,946 g cm$^{-3}$ % |
|---|---|
| >2mm | 0 |
| <2mm >1mm | 7,5 |
| <1mm >850µ | 4,1 |
| <850 >500µ | 32,1 |
| <500µ >425µ | 26,3 |
| <425µ >250µ | 23,8 |
| <250µ | 6,2 |

The product may be used as a normal fuel for blasting agents or it may be used as a carrier to which a sensitiser or other fine fuel powder may be adhered.

It is very important to note that a change in the shape of the particles, for example, nodular, irregular or acicular, or a change in the apparent density may result in a failure to granulate with the abovementioned concentration of binder. The desired granulation can be effected by determining through simple experimentation the necessary concentration of binder for particular shapes and density. The effect of the viscosity of the binder is also an important variable which must also be determined by experimentation.

The aluminium powder used in the example set out above was atomised aluminium powder consisting of nodular and irregular particles. The silicon powder used was material including dust which had been collected during the manufacture of silicon metal. The apparent density of the atomised aluminium powder was about 1,2 g cm$^{-3}$ and of the silicon powder varied from 0,74 to 1,03 g cm$^{-3}$.

The product forms an efficient and substantially hazard free fuel for blasting agents and explosives and it has been found that the silicon provides a useful explosive energy content of about 70% of that of aluminium. The hazard free material is obtained because substantially no dust occurs in the final product from the blender. At ruling costs this results in a cheaper fuel than when aluminium alone is used.

In commercial product granulation may be effected in granulating drums or dishes or in mixing pans, augers and high capacity intensive mixers which subject the feed to a rolling or mixing motion or both.

Different purities of feed materials and binders from those indicated in the above example can be used and the particular choice will depend on costs of materials, end use of the products and quality. As stated above particular circumstances may require certain experimentation in order to obtain optimum results.

The invention has further very important advantages. The agglomerates in the size range of 100 to 850 microns, or any cut thereof, can be partly interstially filled and coated with a sensitising material such as aluminium flake to form a sensitised fuel or explosive ingredient for pre-packed explosives or blasting agents known as "sausages". This can also be done by using the flake in its paste form before it is dried.

Generally the coating will be effected using a solution which is a mixture of an oil soluble basic dyestuff, kerosene diesolene and benzol or other suitable solvents.

As an example of the use of the agglomerates as carriers the following mix was prepared:

400 g of agglomerates sized to −150 μm
100 g of Al flake made by C. Schlenk AG of Germany and identified as 475 NZ
with a solution
1,0 g Fat Blue B DY-SL502 dyestuff supplied by Hoechst S.A.
30 cm³ Kerosene SA 1066 supplied by Bush Boake Allen
2,5 l Diesolene
2,5 l Benzol
6 cm³ of the above solution were used.

The mixed was blended in Starmix Blender for 2 minutes to promote softening of the coating on the aluminium flake and provide adhesion of flake to agglomerate.

The product is a highly effective material for use in explosives giving an efficient use of the energy of the material under practical blasting conditions.

Also the porous agglomerates according to this invention provide excellent carrier material for use in the process claimed in South African Pat. No. 73/6092.

What I claim as new and desire to secure by Letters Patent is:

1. Free flowing substantially dust free porous metal fuel agglomerates comprising combustible metal powder of a size range of 0 to 500 microns, or any cut thereof, granulated with a blender of synthetic resin material by build-up to a porous agglomerate with a size range of 100 to 2500 microns having an apparent density between 0,4 to 1,1.

2. Agglomerates as claimed in claim 1 wherein the combustible powder is of nodular, flaky irregular or acicular shape.

3. Agglomerates as claimed in claim 2 in which the combustible powder is aluminim or aluminium alloy or aluminium mixed with one or more other combustible metals.

4. Agglomerates as claimed in claim 3 in which the combustible powder is a mixture of aluminium and silicon in proportions to yield economical use of the energy in the powders.

5. Agglomerates as claimed in claim 1, wherein the binder is an emulsion or solution of vinyl polymer adhesive.

6. Agglomerates as claimed in claim 5 in which the binder is a solution of polyvinyl alcohol based adhesive.

7. A sensitised fuel for a blasting agent or explosive comprising agglomerates as claimed in claim 3 sized to a range of 100 to 850 microns and partly filled and coated with sensitizing material.

8. A sensitised fuel as claimed in claim 7 in which the sensitizer is aluminium flake.

9. A sensitized fuel as claimed in claim 8 in which the flake is adhered to the agglomerate through the use of a solution comprising a mixture of an oil soluble basic dyestuff, kerosene, dieselene and benzol.

* * * * *